(12) United States Patent
Hisada et al.

(10) Patent No.: US 11,071,888 B2
(45) Date of Patent: Jul. 27, 2021

(54) EXERCISE DATA DISPLAY DEVICE, EXERCISE DATA DISPLAY METHOD, AND COMPUTER READABLE NON-TRANSITORY STORAGE MEDIUM WITH PROGRAM STORED THEREON

(71) Applicant: CASIO COMPUTER CO., LTD., Tokyo (JP)

(72) Inventors: Shigeki Hisada, Mitaka (JP); Hirofumi Nagareda, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 45 days.

(21) Appl. No.: 16/260,056

(22) Filed: Jan. 28, 2019

(65) Prior Publication Data
US 2019/0240537 A1 Aug. 8, 2019

(30) Foreign Application Priority Data

Feb. 6, 2018 (JP) .............................. JP2018-019490

(51) Int. Cl.
| | | |
|---|---|---|
| *G06F 3/0482* | (2013.01) | |
| *G06F 3/01* | (2006.01) | |
| *H04W 4/80* | (2018.01) | |
| *A63B 24/00* | (2006.01) | |

(52) U.S. Cl.
CPC .......... *A63B 24/0062* (2013.01); *G06F 3/011* (2013.01); *G06F 3/017* (2013.01); *G06F 3/0482* (2013.01); *H04W 4/80* (2018.02); *A63B 2220/12* (2013.01); *A63B 2220/17* (2013.01)

(58) Field of Classification Search
CPC ......... A63B 24/0062; A63B 2024/0065–0071; A63B 2220/17; A63B 2220/12; G06F 3/017; G06F 3/011; G06F 3/0482; G06F 1/163; H04W 4/80; H04W 4/029; G06M 3/00; H04M 1/72572; H04M 1/72522
See application file for complete search history.

(56) References Cited

U.S. PATENT DOCUMENTS

| | | | | |
|---|---|---|---|---|
| 6,426,719 | B1 * | 7/2002 | Nagareda | G01C 21/20 340/573.1 |
| 8,676,273 | B1 * | 3/2014 | Fujisaki | H04M 1/6505 455/567 |
| 9,052,798 | B1 * | 6/2015 | Klassen | H04W 4/029 |

(Continued)

FOREIGN PATENT DOCUMENTS

| | | |
|---|---|---|
| JP | 2009222407 A | 10/2009 |
| JP | 2015066005 A | 4/2015 |

(Continued)

*Primary Examiner* — Nyca T Nguyen
(74) *Attorney, Agent, or Firm* — Holtz, Holtz & Volek PC (57) ABSTRACT

A smartphone including a near-field communication circuit capable of performing communication with an electronic terminal; a GPS positioning unit which makes a positional measurement; and a CPU. The electronic terminal includes an acceleration sensor used to count a number of steps and measure an intensity of exercise of a user. The near-field communication circuit receives, from the electronic terminal, an exercise log indicative of the number of steps of the user. The CPU displays, on a touch panel display, a route log positioned by the GPS positioning unit and the exercise log in association with each other.

13 Claims, 9 Drawing Sheets

(56) References Cited

U.S. PATENT DOCUMENTS

| | | |
|---|---|---|
| 9,479,913 B2 | 10/2016 | Uchida |
| 9,656,119 B2 * | 5/2017 | Ura .................. G09B 19/0038 |
| 10,207,175 B2 * | 2/2019 | Klassen ............... H04W 4/029 |
| 10,391,361 B2 * | 8/2019 | Watterson .......... A63B 24/0075 |
| 2006/0136173 A1 * | 6/2006 | Case, Jr. .............. G01C 22/006 702/182 |
| 2008/0096726 A1 * | 4/2008 | Riley ................. A63B 24/0006 482/8 |
| 2008/0125288 A1 * | 5/2008 | Case ..................... A41D 1/002 482/1 |
| 2011/0131005 A1 | 6/2011 | Ueshima et al. |
| 2012/0283855 A1 * | 11/2012 | Hoffman ............ A63B 24/0021 700/91 |
| 2012/0317202 A1 * | 12/2012 | Lewis .................. H04L 63/302 709/204 |
| 2013/0040714 A1 * | 2/2013 | Rosing ................. A63F 13/216 463/7 |
| 2013/0115584 A1 * | 5/2013 | Gordon .................. G09B 19/00 434/247 |
| 2014/0046588 A1 * | 2/2014 | Maezawa ........... A63B 24/0062 701/487 |
| 2014/0316305 A1 * | 10/2014 | Venkatraman ......... A61B 5/681 600/595 |
| 2015/0066172 A1 * | 3/2015 | Yi ......................... G16H 20/30 700/91 |
| 2015/0116189 A1 | 4/2015 | Morita et al. |
| 2016/0081611 A1 * | 3/2016 | Hampton ............... G16H 40/67 600/538 |
| 2017/0035327 A1 * | 2/2017 | Yuen .................... A61B 5/7264 |
| 2018/0056128 A1 * | 3/2018 | Narasimha Rao ..... A61B 5/681 |

FOREIGN PATENT DOCUMENTS

| | | |
|---|---|---|
| JP | 2015088846 A | 5/2015 |
| WO | 2009078114 A1 | 6/2009 |
| WO | 2012098601 A1 | 7/2012 |

* cited by examiner

EXERCISE DATA DISPLAY DEVICE, EXERCISE DATA DISPLAY METHOD, AND COMPUTER READABLE NON-TRANSITORY STORAGE MEDIUM WITH PROGRAM STORED THEREON

CROSS-REFERENCE TO RELATED APPLICATION

This application is based upon and claims the benefit of priority from the prior Japanese Patent Application No. 2018-019490, filed Feb. 6, 2018, the entire contents of which are incorporated herein by reference.

BACKGROUND

1. Technical Field

The technical field relates to an exercise data display device, an exercise data display method, and a computer readable non-transitory storage medium with a program stored thereon.

2. Description of the Related Art

Conventionally, a pedometer has been generally known, which is carried when a user walks to display the number of steps, walking distance, walking speed, and calories burned during walking numerically or graphically. There has also been known an electronic terminal such as a wrist watch with such a pedometer function incorporated therein. Since people swing their arms while walking, the number of steps can be detected easily by detecting the moves using an acceleration sensor in the wrist watch.

However, such a pedometer is only to measure the cumulative number of steps, cumulative distance, and the like and display the measurement results daily or until data are reset. As for calories burned, there is also a pedometer which changes the burned calorie calculation formula according to the speed and the intensity of exercise to calculate the calories burned. Thus, since conventional pedometers are only to display numeric values, it has been difficult to look back and check on what walking in the past was like.

Therefore, there is proposed a pedometer which displays a waking route history using positioning information. Japanese Patent Application Laid-Open No. 2009-222407 discloses an invention of a portable type walk support device including: distance measuring means which measures a moving distance per unit time; step number counting means which counts the number of steps per unit time as above; stride-length calculating means which calculates a stride length from the moving distance and the number of steps; pitch calculating means which calculates a pitch from the number of steps and the unit time; and display means which displays the stride lengths and pitches in the unit time on a two-dimensional graph having a stride-length axis and a pitch axis.

In the above invention, a GPS (Global Positioning System) receiving unit is incorporated in the pedometer body. However, such a GPS receiving unit consumes a large amount of power, which is not suitable to be operated in an environment in which power supply is largely limited such as a wrist watch. Further, in the above invention, a correspondence between the walking hours and the walking route cannot be known.

On the other hand, there is a case where an application having a pedometer function is installed on a so-called smartphone. In this case, however, since the smartphone is not worn closely to the body of a user, a determination whether movement detected by the acceleration sensor is walking or not may not be made correctly. Further, if the smartphone is carried while jogging, since the smartphone could fall to the ground, it is unsuitable.

SUMMARY

According to one embodiment, an exercise data display device includes:
a wireless communication unit which sends or receives signals; a positioning radio wave receiver which receives radio waves from positioning satellites; a display; and a processor, wherein the processor controls the wireless communication unit to receive user's step number history information and status of use information from an electronic terminal having a step counting function, where the status of use information includes information of status of use of a predetermined function which is different from the step counting function, the processor acquires position history information of the electronic terminal from a received positioning radio wave corresponding to a location of the electronic device, where the position history information is a history of user's positions, and the processor controls the display to display the position history information, the user's step number history information, and the status of use information in association with one another.

DETAILED DESCRIPTION

Figure 1:
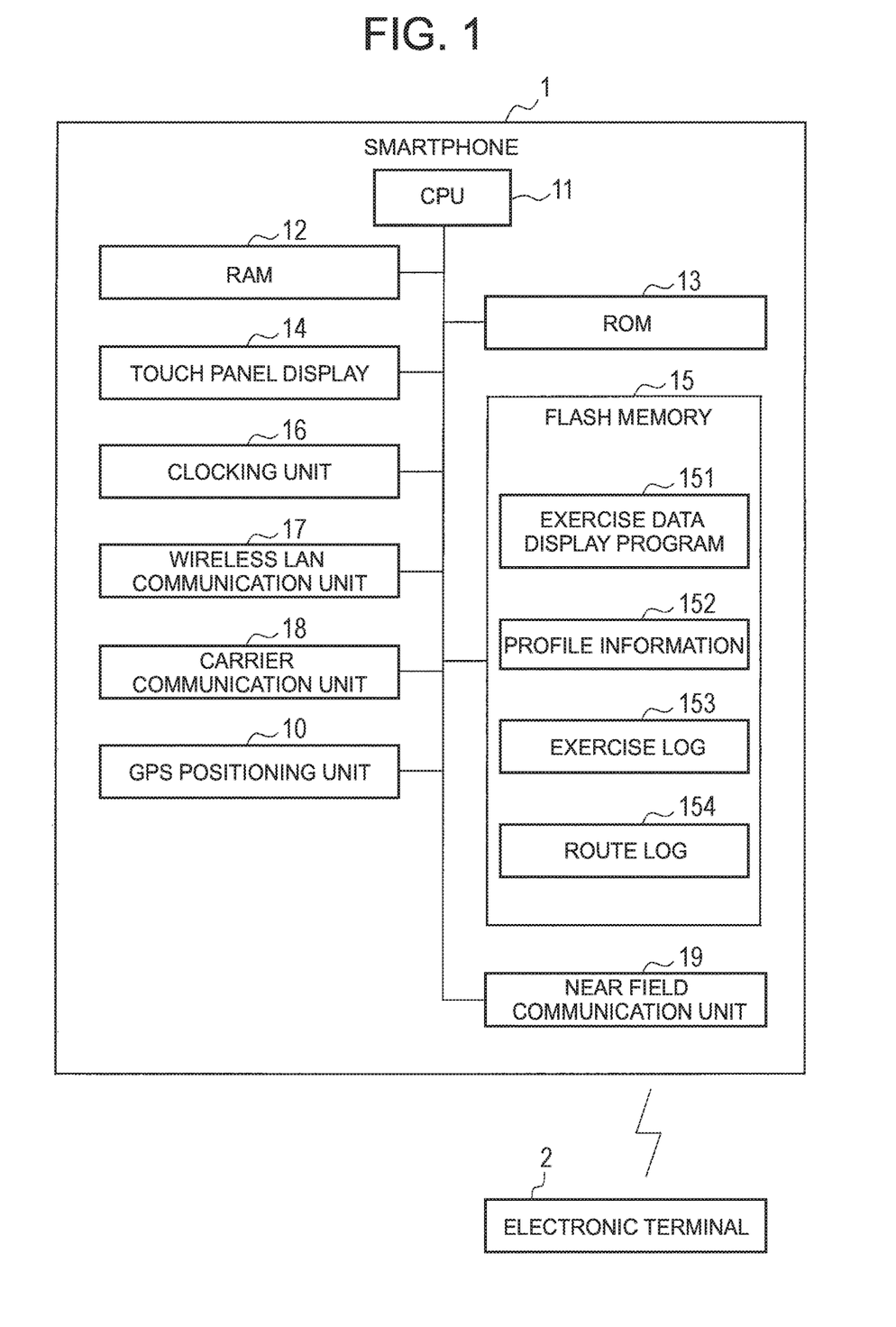
FIG. 1 is a block diagram illustrating each component of a smartphone.

An embodiment will be described in detail below with reference to the accompanying drawings.
FIG. 1 is a block diagram illustrating each component of a smartphone 1.
This system is configured by connecting the smartphone 1 and an electronic terminal 2 communicably through a Bluetooth (registered trademark) Low Energy, near field communication channel. In the embodiment, the electronic terminal 2 is an advertiser and the smartphone 1 is a scanner. The smartphone 1 operates as an exercise data display device which displays exercise history data.

The smartphone 1 is configured to include a CPU (Central Processing Unit) 11, a RAM (Random Access Memory) 12, a ROM (Read Only Memory) 13, a touch panel display 14, a flash memory 15, a clocking unit 16, a wireless LAN communication unit 17, a carrier communication unit 18, a near field communication unit 19, and a GPS positioning unit 10.

The CPU 11 centrally controls this smartphone 1 by executing an application (software program). The touch panel display 14 displays information and accepts user operations on a display surface. The RAM 12 is a memory unit configured as a volatile memory. The ROM 13 is a memory unit configured as a nonvolatile memory. The flash memory 15 is a memory unit configured as a rewritable nonvolatile memory. This flash memory 15 stores an exercise data display program 151, profile information 152, an exercise log 153, and a route log 154, respectively.

The exercise data display program 151 is an application running on this smartphone 1. The exercise data display program 151 causes the CPU 11 to control the display of a graph of step number history information related to an exercise and to display a route during the exercise on a map. The profile information 152 includes the height and weight, birth date, and gender of a user, the target number of steps, and the like. The exercise log 153 is a history of user walking information measured by the electronic terminal 2. The route log 154 is a history of user route information measured by this smartphone 1.

The touch panel display 14 is structured by laminating a transparent touch panel on a planar display. The CPU 11 displays characters, graphics, and the like on this display, and acquires operation information on the touch panel.

The clocking unit 16 keeps time. The wireless LAN communication unit 17 performs, for example, Wi-Fi standard wireless communication. The carrier communication unit 18 performs wireless communication with a base station through a network. The near field communication unit 19 performs, for example, Bluetooth (registered trademark) Low Energy, near field communication. The CPU 11 uses this near field communication unit 18 to receive user's step number history information from the electronic terminal 2 and store the information as the exercise log 153.

The GPS positioning unit 10 uses a known GPS (Global Positioning System) to position the current location, and outputs position information composed of the longitude, latitude, and altitude. The CPU 11 records a history of this position information in the route log 154.

Figure 2:
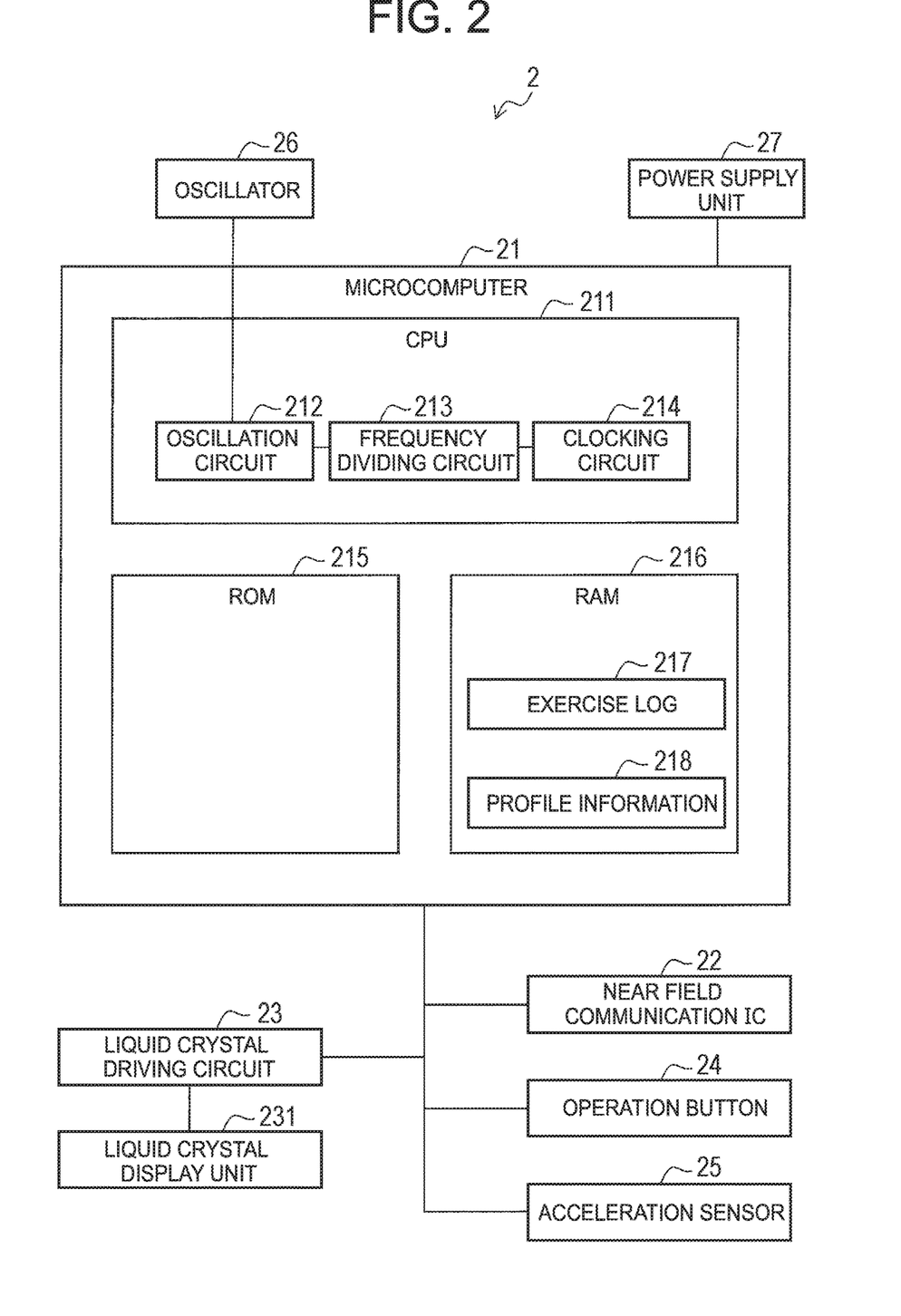
FIG. 2 is a block diagram illustrating each component of an electronic terminal.

FIG. 2 is a block diagram illustrating each component of the electronic terminal 2.

The electronic terminal 2 is, for example, a digital display wrist-watch-type electronic watch, but it may be an hour-hand display (analog display) wrist-watch-type electronic watch, or an activity meter. This electronic terminal 2 includes a microcomputer 21, an oscillator 26, and a power supply unit 27 to keep time. The electronic terminal 2 also includes a near field communication IC (Integrated Circuit) 22, a liquid crystal driving circuit 23 and a liquid crystal display unit 231, operation buttons 24, and an acceleration sensor 25.

The microcomputer 21 is configured to include a CPU 211, a ROM 215, and a RAM 216. This CPU 211 is configured to include an oscillation circuit 212, a frequency dividing circuit 213, and a clocking circuit 214.

The CPU 211 performs various arithmetic processing to centrally control the entire operation of the electronic terminal 2. The CPU 211 reads and executes an unillustrated control program to make each component carry out operation related to time display. The CPU 211 is display control means which controls the liquid crystal driving circuit 23 to cause the liquid crystal display unit 231 to display time information, step number information, exercise intensity information, and the like.

In the RAM 216, an exercise log 217 and profile information 218 are stored. The exercise log 217 is a history of user walking information measured by the electronic terminal 2. The profile information 218 includes information on the height and weight, birth date, and gender of the user, the target number of steps, and the like, which is received from the smartphone 1.

The liquid crystal driving circuit 23 is a circuit which controls the driving of the liquid crystal display unit 231. The CPU 211 controls the liquid crystal driving circuit 23 to cause the liquid crystal display unit 231 to display desired characters and figures.

The operation buttons 24 are buttons used by the user to operate this watch. The acceleration sensor 25 detects acceleration of the electronic terminal 2. The CPU 211 can detect the intensity of exercise in the walking and the number of steps of the user by comparing a value of the acceleration with a predetermined threshold value.

The oscillator 26 and the oscillation circuit 212 generate a unique frequency signal and outputs the frequency signal to the frequency dividing circuit 213. As the oscillator 26, for example, a crystal oscillation circuit is used.

The frequency dividing circuit 213 divides the signal input from the oscillation circuit 212 into various kinds of frequency signals used by the CPU 211 and the clocking circuit 214, and outputs the divided signals.

The clocking circuit 214 is a counter circuit which counts the number of predetermined frequency signals input from the frequency dividing circuit 213, and continues to add the number to the initial time to count the current time. The current time counted by the clocking circuit 214 is read by the CPU 211 and used for time display. This time count may be controlled by software.

The power supply unit 27 has a structure capable of operating the electronic terminal 2 continuously for a long period and stably, which is, for example, a combination of a battery and a DC-DC converter. Thus, the output voltage of the power supply unit 27 in operation maintains a predetermined value.

The near field communication IC 22 is wireless communication means which exchanges information with the near field communication unit 19 of the smartphone 1, for example, via Bluetooth (registered trademark) Low Energy communication.

Figure 3:
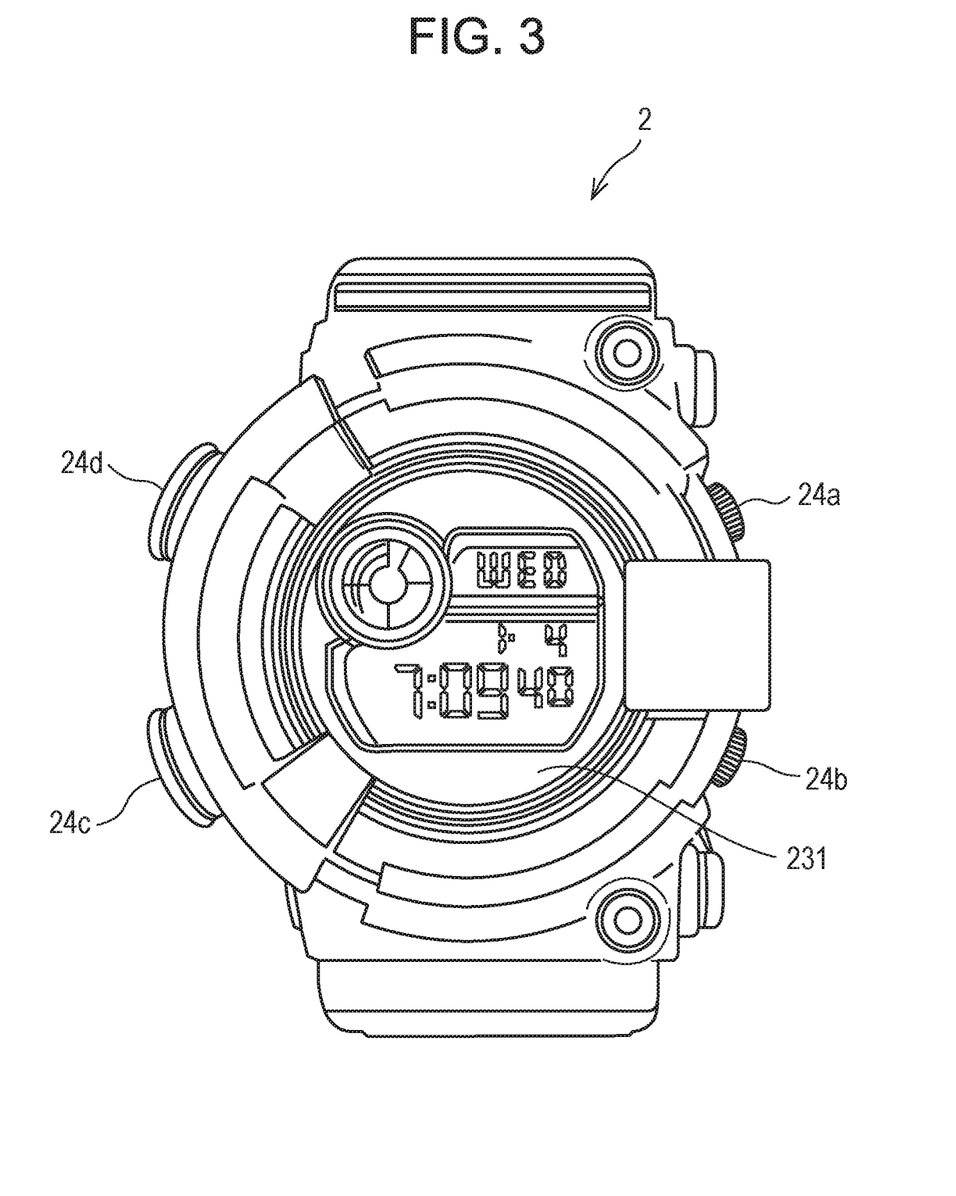
FIG. 3 is an external view of the electronic terminal.

FIG. 3 is an external view of the electronic terminal 2.

The electronic terminal 2 is configured to include the liquid crystal display unit 231 which displays the current time, and operation buttons 24a to 24d. These operation buttons 24a to 24d are operation means used to operate the electronic terminal 2, and among them, the operation button 24c is a button related to the communication connection with the smartphone 1.

First, the user operates the smartphone 1 to start the exercise data display program 151 and give an instruction of wireless connection with the electronic terminal 2. In this instance, the CPU 11 displays a communication guidance screen (not illustrated) on the touch panel display 14.

On this communication guidance screen, an image indicative of a connect button with the electronic terminal 2 and a balloon saying "Hold the button down for three seconds or until a Bluetooth mark on the watch lights up" are displayed. According to this communication guidance screen, the user holds down the operation button 24c of the electronic terminal 2 to establish pairing between the electronic terminal 2 and the smartphone 1 in order to establish the wireless connection. From then on, the electronic terminal 2 and the smartphone 1 establish communication connection autonomously at predetermined hours four times a day to synchronize information and disconnect the communication after that. Assuming that the communication connection is possible at least once a day, the CPU 211 records one day's exercise log 217 in a single communication. Therefore, the communication processing can be performed even when the storage capacity of the RAM 216 is small.

Figure 4:
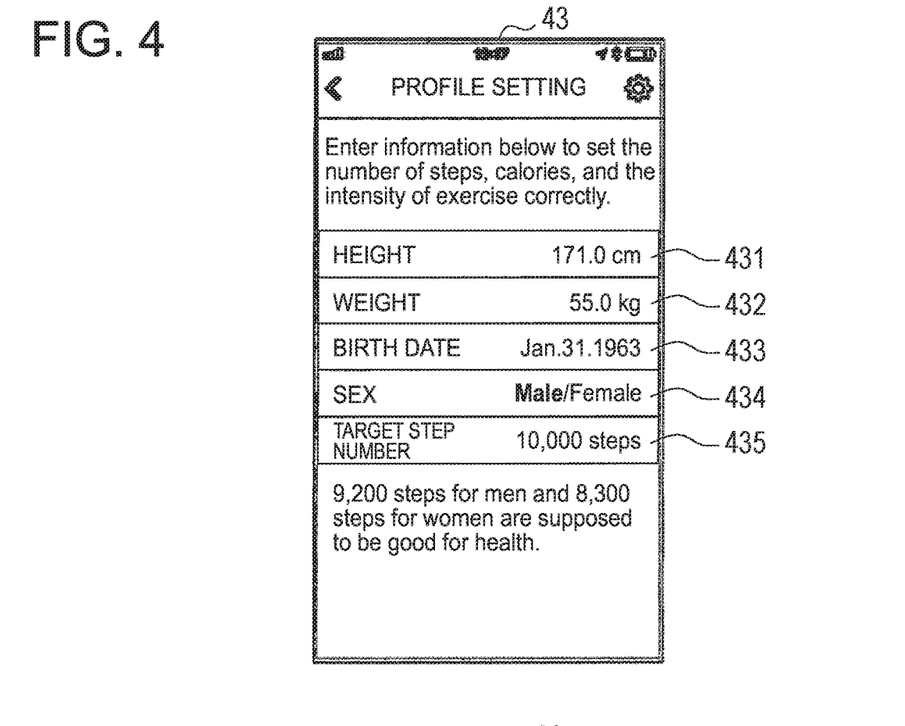
FIG. 4 is an illustration of a profile setting screen.

FIG. 4 illustrates a profile setting screen 43.

When the user gives an instruction of profile settings from a main screen after starting the exercise data display program 151, the CPU 11 displays the profile setting screen 43 on the touch panel display 14.

The profile setting screen 43 includes a height field 431, a weight field 432, a birth date field 433, a gender field 434, and a target step number field 435.

The height field 431 is a field for displaying the height of the user. When this height field 431 is tapped, a pulldown menu for entering the height of the user appears to allow the height value to be modified.

The weight field 432 is a field for displaying the weight of the user. When this weight field 432 is tapped, a pulldown menu for entering the weight of the user appears to allow the weight value to be modified.

The birth date field 433 is a field for displaying the birth date of the user. When this birth date field 433 is tapped, a calendar type entry menu for entering the birth date of the user appears to allow the birth date to be modified.

The gender field 434 is a field for displaying and entering the gender of the user. In FIG. 4, "Male" is selected and highlighted in bold. "Female" is not selected, which is expressed in normal font thickness. Here, when the user taps "Female," "Female" is changed to be highlighted in bold, which indicates that "Female" is selected.

The target step number field 435 is a field for displaying the number of steps targeted by the user. When this target step number field 435 is tapped, a pulldown menu for entering the number of steps targeted by the user appears to allow the target number of steps to be modified.

From this profile setting screen 43, the profile information 152, composed of the height and weight, birth date, gender, and target step number, is stored in the flash memory 15. The profile information 152 is synchronized with the profile information 218 on the electronic terminal 2 by the synchronization between the electronic terminal 2 and the smartphone 1.

Figure 5:
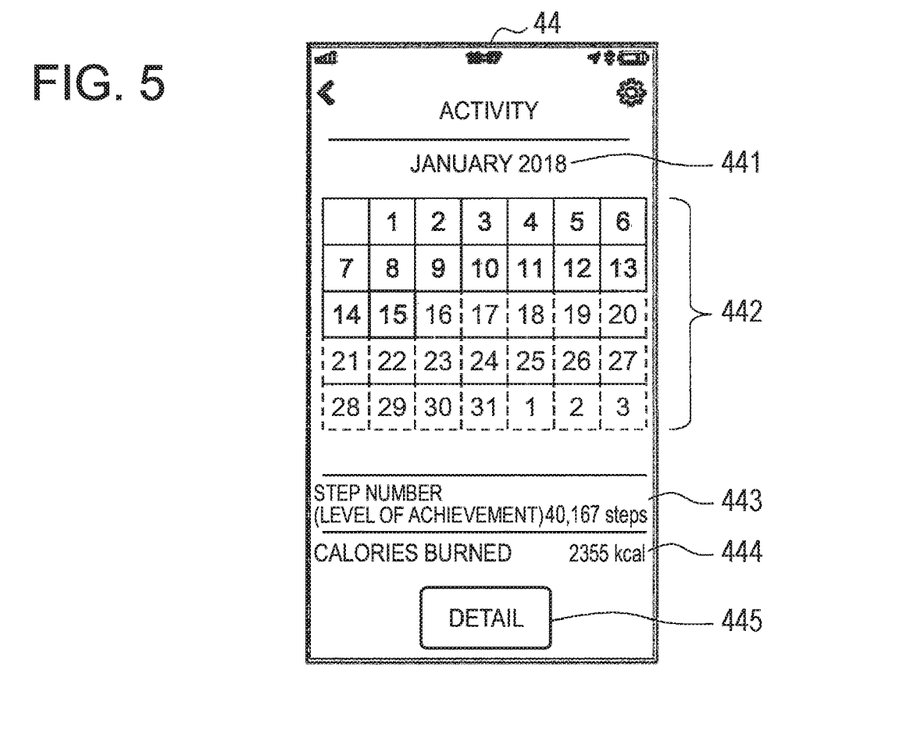
FIG. 5 is an illustration of an activity screen.

FIG. 5 illustrates an activity screen 44.

When the user starts the exercise data display program 151, this activity screen 44 is displayed.

The activity screen 44 includes a month field 441, a calendar area 442, a step number field 443, a burned calorie field 444, and a detail button 445.

The month field 441 is a field indicative of the current month. Here "January 2018" is displayed.

The calendar area 442 is an area for displaying the current month calendar. In the calendar area 442, when today or any one of past days is tapped, a transition is made from this screen to an exercise data display screen 45 to be described later.

The step number field 443 is a field for displaying the cumulative number of steps in the current month.

The burned calorie field 444 is a field for displaying the cumulative calories burned in the current month.

The detail button 445 is a button for making a transition to the exercise data display screen 45 which displays today's exercise data.

Figure 6:
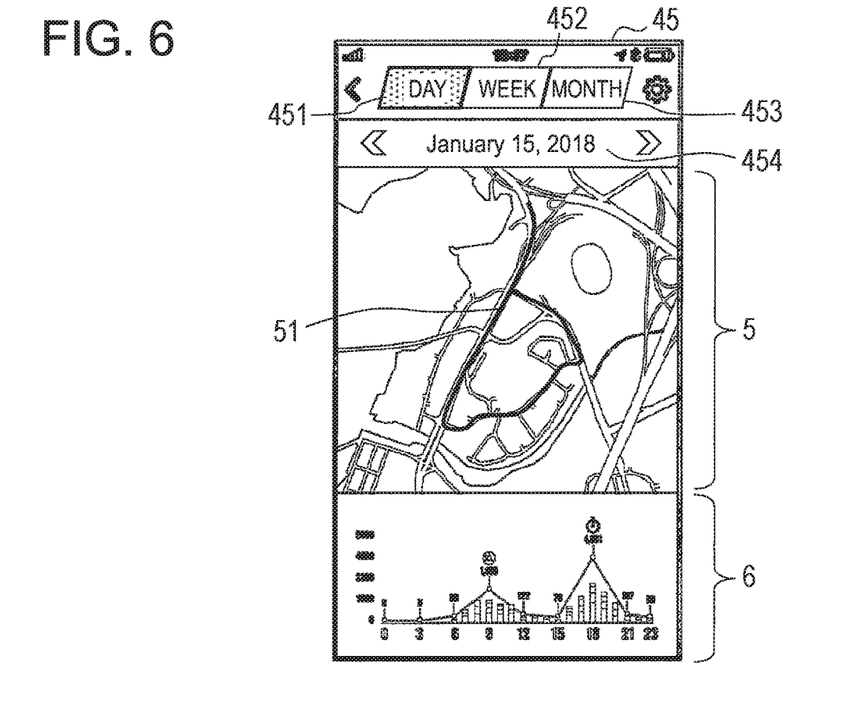
FIG. 6 illustrates an exercise data display screen (part 1).
Figure 7:
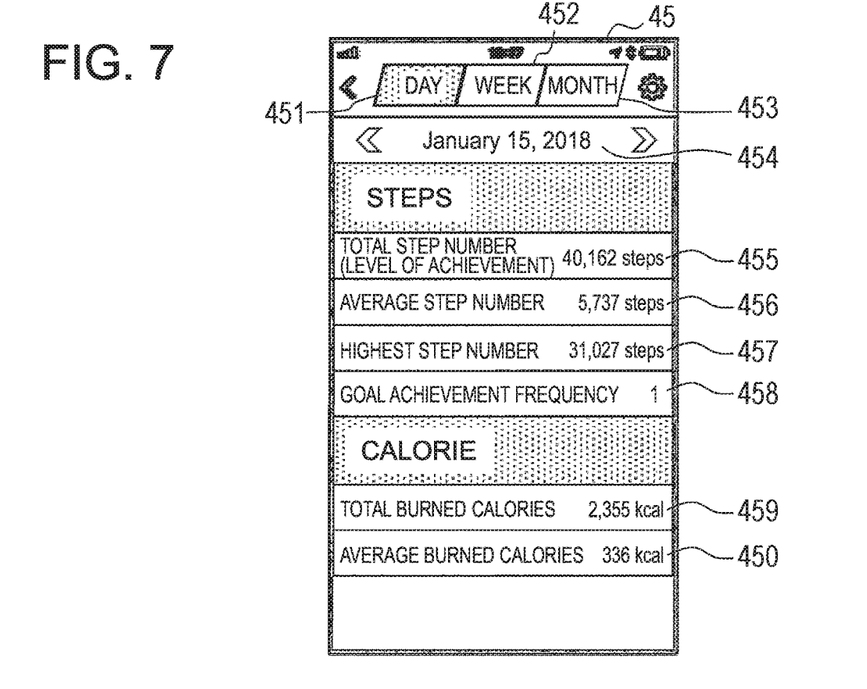
FIG. 7 illustrates an exercise data display screen (part 2).

FIG. 6 and FIG. 7 illustrate the exercise data display screen 45. FIG. 6 illustrates the upper half of the exercise data display screen 45. FIG. 7 illustrates the lower half of the screen to be displayed by scrolling the screen down.

At the top of exercise data display screen 45, a day select button 451, a week select button 452, and a month select button 453 are displayed, and any one of them is in a selected state. In FIG. 6, the day select button 451 is in the selected state, and daily exercise data are displayed.

Displayed just below the day select button 451, the week select button 452, and the month select button 453 is a month-day-year field 454. The month-day-year field 454 is a field for displaying the month-day-year of the selected period, and "Jan. 15, 2018" is displayed in FIG. 6. The user can tap the right-side icon of the month-day-year field 454 to shift the selected period to "Jan. 16, 2018" which is a period one after that period. Further, the user can tap the left-side icon of the month-day-year field 454 to shift the selected period to "Jan. 14, 2018" which is a period one before that period.

Below the month-day-year field 454 is a scroll area to be scrolled by up-down swipe. A map area 5 indicative of a route 51 and a graph area 6 are displayed in the upper half of the scroll area of the exercise data display screen 45.

The route 51 displayed in the map area 5 is a history of position information on this smartphone 1 two-dimensionally displayed on the map. The graph area 6 indicates a history of user's step number information according to the exercise intensities.

In the lower half of the scroll area on the exercise data display screen 45, a total step number field 455, an average step number field 456, a highest step number field 457, a goal achievement frequency field goal achievement frequency field 458, a total burned calorie field 459, and an average burned calorie field 450 are displayed.

The total step number field 455 is a field for displaying the cumulative number of steps in the selected period, and the cumulative number of steps on Jan. 15, 2018 is displayed here.

The average step number field 456 is a field for displaying the average number of steps per hour in the selected period, and the average number of steps on Jan. 15, 2018 is displayed here.

The highest step number field 457 is a field for displaying the highest value for the number of steps per hour in the selected period, and the highest number of steps on Jan. 15, 2018 is displayed here.

The goal achievement frequency field 458 is a field for displaying the frequency of goal achievements in the selected period.

The total burned calorie field 459 is a field for displaying the total burned calories in the selected period, and the total burned calories on Jan. 15, 2018 are displayed here.

The average burned calorie field 450 is a field for displaying the average value for the burned calories per hour in the selected period, and the average value for the burned calories per hour on Jan. 15, 2018 is displayed here.

Figure 8:
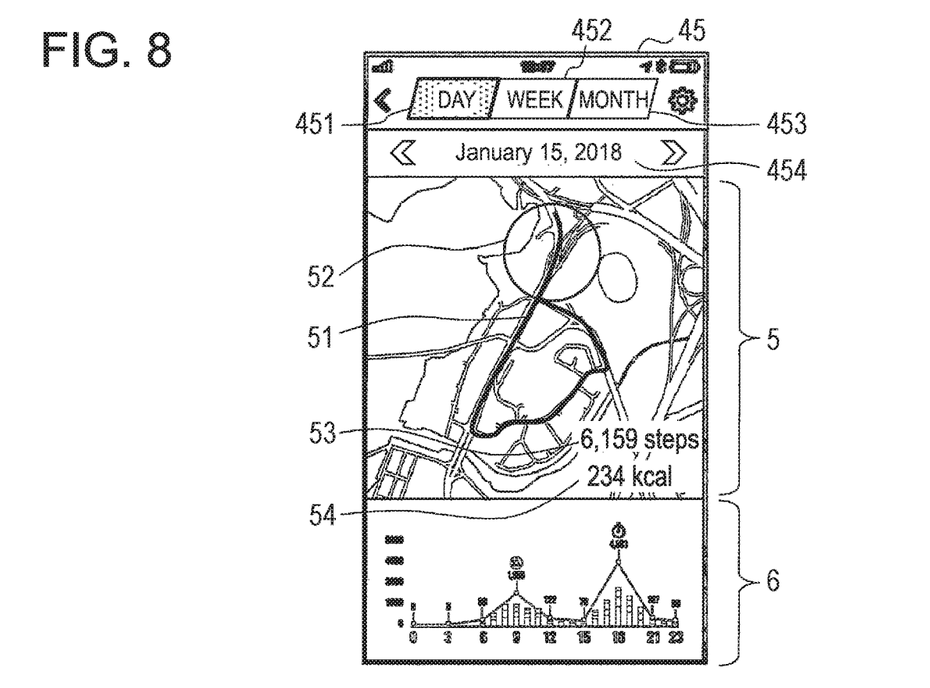
FIG. 8 illustrates a state when a section is designated on a map of the exercise data display screen.

FIG. 8 illustrates a screen when a section 52 is designated on the map of the exercise data display screen 45.

When the user multi-taps the map area 5 on the exercise data display screen 45 illustrated in FIG. 6, the section 52 is designated and a transition to the screen illustrated in FIG. 8 is made.

Since part of the route 51 is included in this section 52, the CPU 11 refers to exercise data corresponding to this route 51 to display step number information 53 and burned calorie information 54 in the map area 5. Thus, the user can appropriately check on the number of steps and the calories burned in the part of the route 51 indicative of the past walking.

Figure 9:
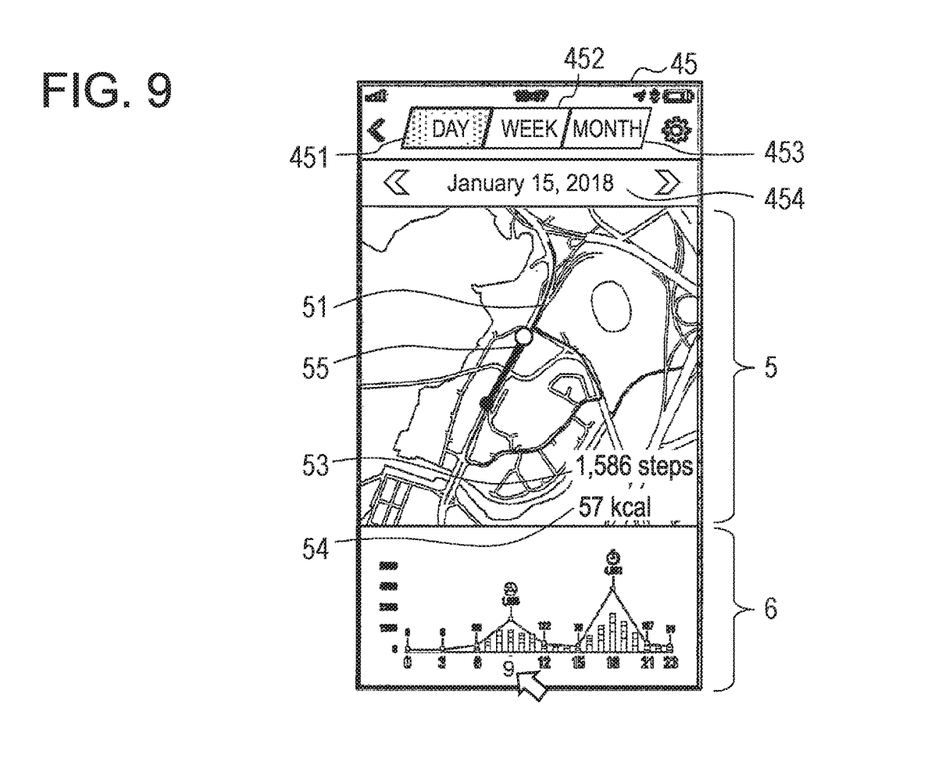
FIG. 9 illustrates a state when a period on the exercise data display screen is designated.

FIG. 9 illustrates a screen when a period on the exercise data display screen 45 is designated.

When the user multi-taps the graph area 6 on the exercise data display screen 45 illustrated in FIG. 6, a desired period is designated, and a transition to the screen illustrated in FIG. 9 is made. Here, a period between nine and ten o'clock is designated as the desired period.

In the map area 5, an intra-period route 55, and step number information 53 and burned calorie information 54 within the period are newly displayed.

The intra-period route 55 indicates part of the route in the period designated by the user. As the step number information 53 and the burned calorie information 54, the number of steps and the calories burned in the period designated by the user are displayed. Thus, the user can appropriately check on the route, the number of steps, and the calories burned in the period designated from the route 51 indicative of the past walking.

Figure 10:
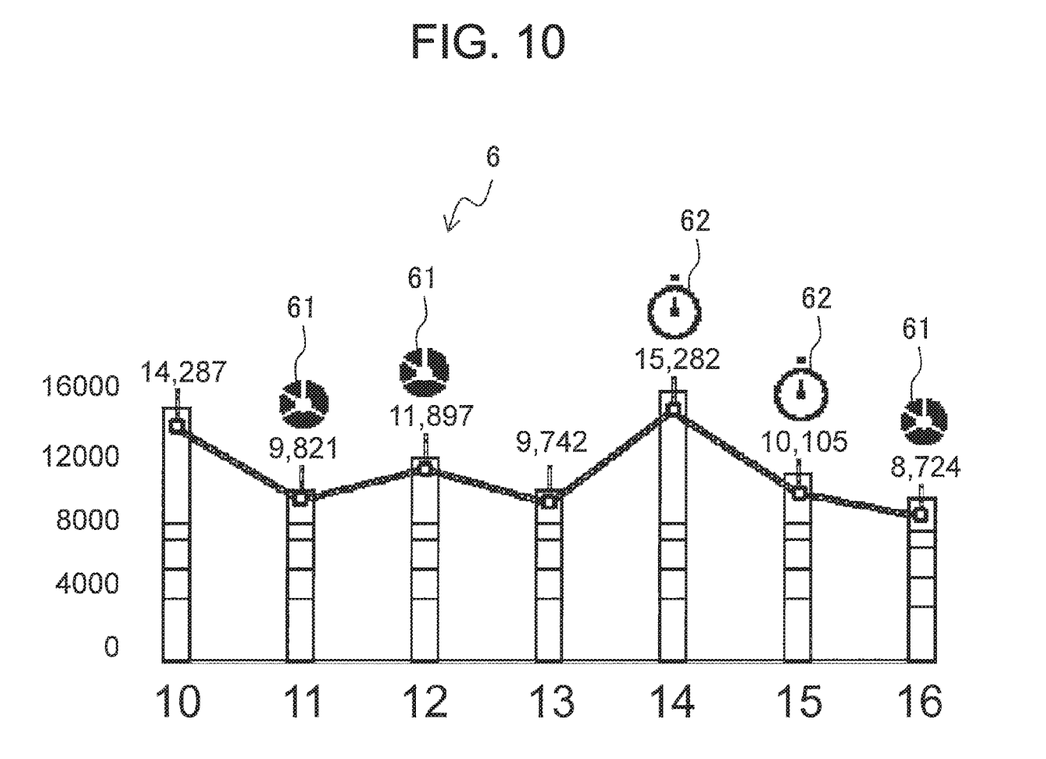
FIG. 10 is an enlarged view of a graph area indicative of exercise data.

FIG. 10 is an enlarged view of the graph area 6 indicative of exercise data.

In a bar graph of this graph area 6, the abscissa represents 24-hour clock time and the ordinate represents the number of steps. The height of each bar represents the number of steps in each period. Further, a circuit training icon 61 or a stopwatch icon 62 may be displayed above each bar, which indicates how the electronic terminal 2 was used to do exercise in each period.

The leftmost bar indicates the state of exercise in a period between ten to eleven o'clock. The number of steps in this period is 14,287.

As for a bar in a period between eleven to twelve o'clock, the number of steps is 9,821. The circuit training icon 61 is displayed above this bar, and this indicates that the user operated the electronic terminal 2 in an interval timer mode.

Note that the interval timer means a timer which sounds the alarm repeatedly at designated intervals. The user can operate the electronic terminal 2 in the interval timer mode to alternate weight training and short intervals in order to do aerobic exercise continuously while keeping user's heart rate moderate. Note that such training is called circuit training.

As for a bar in a period between twelve and thirteen o'clock, the number of steps is 11,897. The circuit training icon 61 is displayed above this bar, and this indicates that the user operated the electronic terminal 2 in the interval timer mode.

As for a bar in a period between thirteen and fourteen o'clock, the number of steps is 9,742.

As for a bar in a period between fourteen and fifteen o'clock, the number of steps is 15,282. The stopwatch icon 62 is displayed above this bar, and this indicates that the user operated the electronic terminal 2 in a stopwatch mode.

As for a bar in a period between fifteen and sixteen o'clock, the number of steps is 10,105. The stopwatch icon 62 is displayed above this bar, and this indicates that the user operated the electronic terminal 2 in the stopwatch mode.

As for a bar in a period between sixteen and seventeen o'clock, the number of steps is 8,724. The circuit training icon 61 is displayed above this bar, and this indicates that the user operated the electronic terminal 2 in the interval timer mode.

The CPU 211 of the electronic terminal 2 records an exercise intensity per unit time calculated by counting the number of steps, an exercise intensity-specific step number per unit time, and the status of use of a stopwatch or interval timer function implemented per unit time. The CPU 211 transfers, to the smartphone 1, the exercise log 217 recorded in the RAM 216 through communication means such as Bluetooth.

The CPU 11 of the smartphone 1 provides a graph display of the exercise intensity-specific step number per unit time calculating by counting the number of steps in association with the status of use of the stopwatch or the interval timer for the purpose of training. Thus, the user can grasp the past exercise effect easily.

Figure 11:
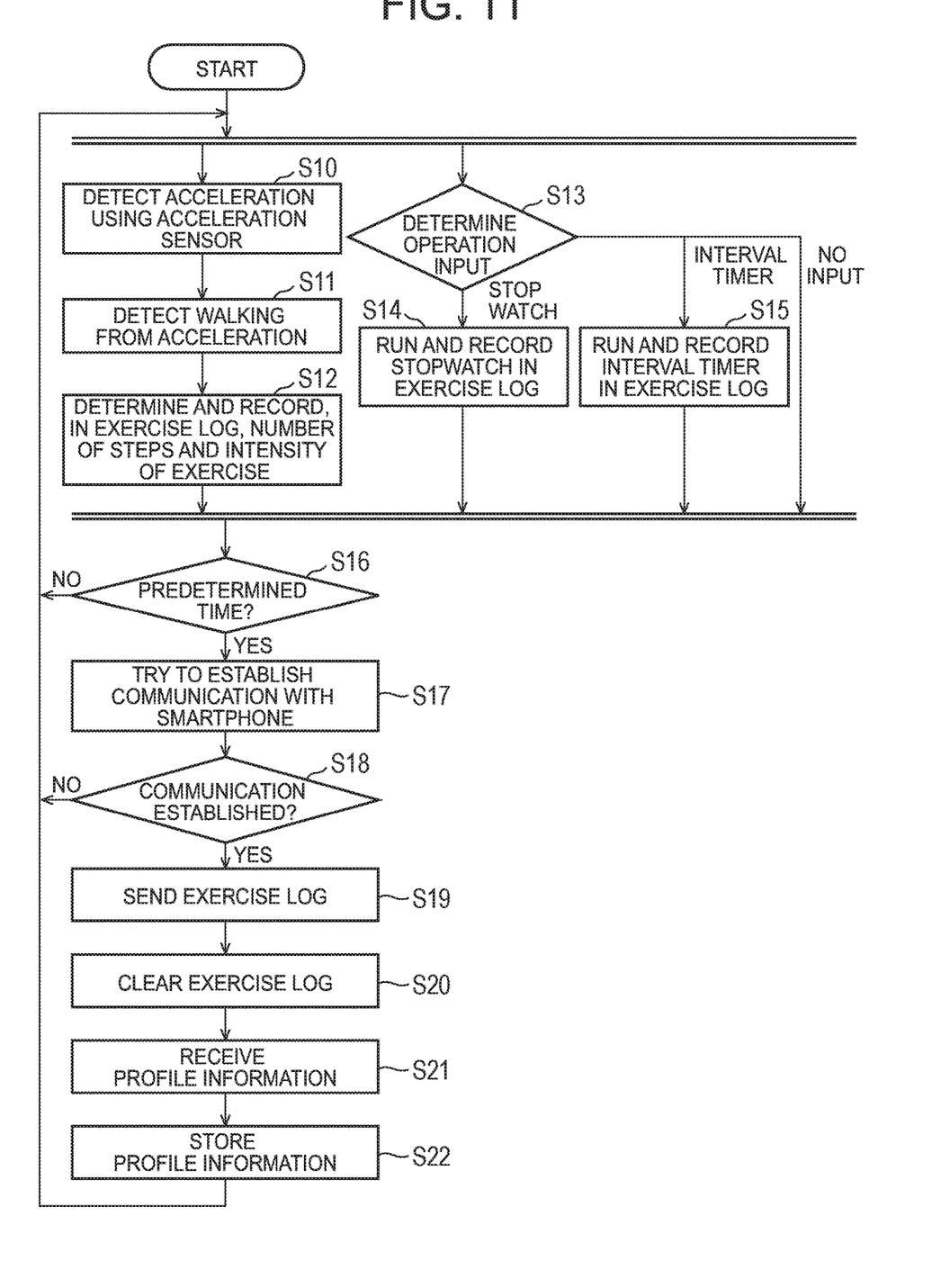
FIG. 11 is a flowchart illustrating exercise log recording processing performed by the electronic terminal.

FIG. 11 is a flowchart illustrating recording processing performed by the electronic terminal 2 on the exercise log 217.

The CPU 211 of the electronic terminal 2 executes a walking detection process in step S10 to S12 and a stopwatch or interval timer process in parallel.

In the walking detection process, the CPU 211 uses the acceleration sensor 25 to detect acceleration (step S10) and detects walking from this acceleration (step S11). Then, the CPU 211 determines and records, in the exercise log 217, the number of steps and the exercise intensity in each walking (step S12), and proceeds to step S16. Note that the CPU 211 determines the exercise intensity in each walking by multiplying the measured acceleration by a conversion factor decided by the height, weight, and gender of the user.

In parallel with this walking detection process, the CPU 211 determines operation input from any of the operation buttons 24a to 24d (step S13). When detecting stopwatch operation input, the CPU 211 proceeds to step S14 to run the stopwatch and record it in the exercise log 217. When detecting interval timer input, the CPU 211 proceeds to step S15 to run the interval timer and record it in the exercise log 217. When no operation input is detected, the CPU 211 proceeds directly to step S16. Thus, in the exercise log 217 (step number history information), the status of use of the stopwatch or the status of use of the interval timer (status of use information) for the purpose of training is recorded.

In step S16, the CPU 211 determines whether it is a predetermined time or not. Here, the term "predetermined time" means the time when communication with the smartphone 1 is established. When it is not the predetermined time (No in step S16), the CPU 211 executes step S10 and step S13 in parallel.

When it is the predetermined time (Yes in step S16), the CPU 211 tries to establish communication with the smartphone 1 (step S17). When the communication with the smartphone 1 is not established (No in step S18), the CPU 211 executes step S10 and step S13 in parallel again.

When the communication with the smartphone 1 is established (Yes in step S18), the CPU 211 sends the exercise log 217 to the smartphone 1 (step S19) and clears this exercise log 217 (step S20). Further, the CPU 211 receives profile information 152 from the smartphone 1 (step S21) and stores the profile information 152 in the RAM 216. Thus, profile information can be synchronized with that on the smartphone 1. After that, the CPU 211 executes step S10 and step S13 in parallel again.

Figure 12:
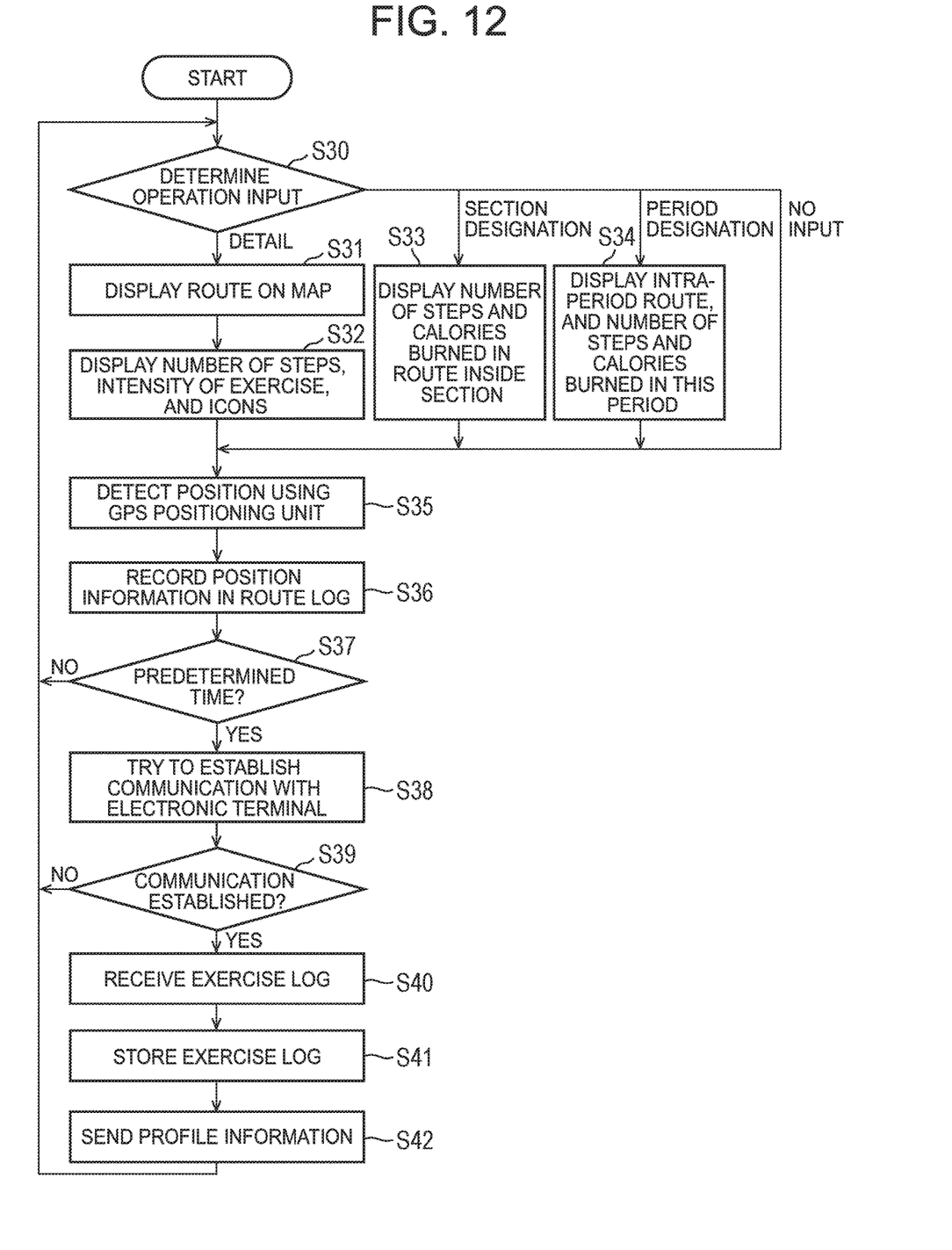
FIG. 12 is a flowchart illustrating route log recording processing and display processing for the route log and the exercise log performed by the smartphone.

FIG. 12 is a flowchart illustrating recording processing for the route log 154 and display processing for the route log 154 and the exercise log 153 performed by the smartphone 1.

Based on input information on the touch panel display 14, the CPU 11 determines whether there is operation input (step S30). When the operation input is a tap on the detail button 445 or the calendar area 442, the CPU 11 displays the route 51 in the map area 5 (step S31). Further, the CPU 11 provides a bar-graph display of the number of steps for each exercise intensity and displays the graph area 6 including the circuit training icon 61 and the stopwatch icon 62 (step S32). After completion of processing in step S32, the CPU 11 proceeds to step S35.

When the operation input is to designate the section 52 in the map area 5, the CPU 11 displays the number of steps and calories burned in the route 51 inside the section 52 (step S33), and proceeds to processing in step S35. Note that the designation of the section 52 by the user corresponds to an instruction to designate part of position history information.

When the operation input is to designate a period in the graph area 6, the CPU 11 displays this intra-period route 55, and the number of steps and calories burned in the period (step S34), and proceeds to processing in step S35. Note that the designation of the period in the graph area 6 by the user corresponds to an instruction to designate part of step number history information.

In step S35, the CPU 11 uses the GPS positioning unit 10 to measure the position (step S35), and records measured position information in the route log 154 (step S36).

In step S37, the CPU 11 determines whether it is a predetermined time. Here, the term "predetermined time" means the time when communication with the electronic terminal 2 is established. When it is not the predetermined time (No in step S37), the CPU 11 returns to the processing in step S30.

When it is the predetermined time (Yes in step S37), the CPU 11 tries to establish communication with the electronic terminal 2 (step S38). When the communication with the electronic terminal 2 is not established (No in step S39), the CPU 11 returns to the processing in step S30.

When the communication with the electronic terminal 2 is established (Yes in step S39), the CPU 11 receives the exercise log 217 from the electronic terminal 2 (step S40) and stores the exercise log 217 as the exercise log 153 (step S41). Further, the CPU 11 sends the profile information 152 to the electronic terminal 2 (step S42), and returns to the processing in step S30.

(Variations)

The embodiment is not limited to the aforementioned description, and modifications are possible without departing from the scope of the above description. For example, there are variations (a) to (e) below.

(a) The number of times of synchronization between the smartphone 1 and the electronic terminal 2 is not limited to four times a day. Further, the synchronization trigger is not limited to time, and any other trigger may be used.

(b) The form of the smartphone 1 to display the exercise log in association with the route log is not limited to the aforementioned embodiment, and any other form may be adopted.

(c) The target counted by the CPU 211 of the electronic terminal 2 is not limited to the exercise intensity-specific step number, and it may be simply the number of steps. Further, the target for which the smartphone 1 provides a graph display is not limited to the history of exercise intensity-specific step number information, and it may be simply a history of step number information.

(d) The icons displayed on the smartphone 1 in association with the graph of the exercise log are not limited to the circuit training icon 61 and the stopwatch icon 62. Any other icon indicative of an operation on the side of the electronic terminal 2 may be displayed in association with the graph of the exercise log.

(e) The electronic terminal 2 may also record, as the exercise log, calories burned per unit time calculated by counting the number of steps, and the burned calorie-specific step number per unit time. Note that the calories burned can be calculated based on the acceleration detected by the acceleration sensor and the profile information.

What is claimed is:

1. An exercise data display device comprising:
   a near field communication circuit which sends and receives signals;
   a positioning radio wave receiver which receives radio waves from positioning satellites;
   a display; and
   a processor,
   wherein:
   the processor controls the near field communication circuit to receive a user's step number history information and status of use information from an electronic terminal having a step counting function, the status of use information including information regarding (i) a status of use by the user of a predetermined function of the electronic terminal, the predetermined function being a function of the electronic terminal which is different from the step counting function, and (ii) a running status of a stopwatch or a timer, the user's step number history information including a plurality of step numbers of the user, and each of the plurality of step numbers of the user corresponding to a respective one of a plurality of exercise intensities,
   the processor acquires position history information of the exercise data display device from a received positioning radio wave corresponding to a location of the exercise data display device, the position history information comprising a history of the user's positions, and
   the processor controls the display to display fil the position history information, (ii) the user's step number history information, which is calculated per unit time by the step counting function, and (iii) the status of use information, in such a way that each of the plurality of step numbers of the user is displayed, along with its corresponding respective one of the plurality of exercise intensities, in association with the information regarding the running status of the stopwatch or the timer.

2. The exercise data display device according to claim 1, wherein the display comprises a touch panel display which accepts an operation performed by the user on information displayed on the display,
   wherein when the touch panel display accepts an operation to designate a part of the position history information as the operation performed by the user, the user's step number history information corresponding to the part of the position history information designated by the user is displayed.

3. The exercise data display device according to claim 2, wherein the processor controls the display to display the position history information and an icon, indicative of the status of use of the predetermined function different from the step counting function, in a corresponding position every predetermined period.

4. The exercise data display device according to claim 1, wherein the display comprises a touch panel display which accepts an instruction on information displayed on the display,
wherein when the touch panel display accepts an operation to designate a part of the user's step number history information, the position history information corresponding to the designated part of the user's step number history information is displayed.

5. The exercise data display device according to claim 4, wherein the processor controls the display to display the position history information and an icon, indicative of the status of use of the predetermined function different from the step counting function, in a corresponding position every predetermined period.

6. The exercise data display device according to claim 1, wherein the processor controls to display, as the information regarding the running status of the stopwatch or the timer, an icon representing the stopwatch or the timer.

7. The exercise data display device according to claim 6, wherein the processor controls to display the icon at a position adjacent to a respective one of the plurality of step numbers that is associated with the status of use information to which the icon belongs.

8. The exercise data display device according to claim 1, wherein the processor controls the display to display the position history information and an icon, indicative of the status of use of the predetermined function different from the step counting function, in a corresponding position every predetermined period.

9. The exercise data display device according to claim 1, wherein:
the electronic terminal is selectively operable in a plurality of predetermined modes; and
the predetermined function is a function of the electronic terminal associated with a respective one of the plurality of predetermined modes.

10. The exercise data display device according to claim 9, wherein the plurality of predetermined modes include an interval timer mode and a stopwatch mode.

11. The exercise data display device according to claim 1, wherein the electronic terminal is selectively operable in a plurality of modes, each of the plurality of modes is associated with a respective one of a plurality of functions, and the plurality of functions include the step counting function and the predetermined function different from the step counting function.

12. An exercise data display method executed by an electronic device including: a near field communication circuit which sends and receives signals to and from an electronic terminal having a step counting function; a positioning radio wave receiver which receives radio waves from positioning satellites; a display; and a processor, the method comprising:
acquiring position history information of the electronic device from a received positioning radio wave corresponding to a location of the electronic device, the position history information comprising a history of a user's positions;
controlling the near field communication circuit to receive, from the electronic terminal having the step counting function, the user's step number history information and status of use information, the status of use information including information regarding (i) a status of use by the user of a predetermined function of the electronic terminal, the predetermined function being a function of the electronic terminal which is different from the step counting function, and (ii) a running status of a stopwatch or a timer, the user's step number history information including a plurality of step numbers of the user, and each of the plurality of step numbers of the user corresponding to a respective one of a plurality of exercise intensities; and
controlling the display to display (i) the position history information, (ii) the user's step number history information, which is calculated per unit time by the step counting function, and (iii) the status of use information, in such a way that each of the plurality of step numbers is displayed, along with its corresponding respective one of the plurality of exercise intensities, in association with the information regarding the running status of the stopwatch or the timer.

13. A non-transitory computer readable storage medium storing thereon a program executable by an exercise data display device, the exercise data display device including: a near field communication circuit which sends and receives signals to and from an electronic terminal having a step counting function; a positioning radio wave receiver which receives radio waves from positioning satellites; a display; and a processor, and the program being executable by the exercise data display device to control the exercise data display device to:
receive, via the near field communication circuit from the electronic terminal having the step counting function, a user's step number history information and status of use information, the status of use information including information regarding (i) a status of use by the user of a predetermined function of the electronic terminal, the predetermined function being a function of the electronic terminal which is different from the step counting function, and (ii) a running status of a stopwatch or a timer, the user's step number history information including a plurality of step numbers of the user, and each of the plurality of step numbers of the user corresponding to a respective one of a plurality of exercise intensities;
acquire position history information comprising a history of the user's positions based on the received radio waves from the positioning satellites; and
control the display to display (i) the position history information, (ii) the user's step number history information, which is calculated per unit time by the step counting function, and (iii) the status of use information, in such a way that each of the plurality of step numbers of the user is displayed, along with its corresponding respective one of the plurality of exercise intensities, in association with the information regarding the running status of the stopwatch or the timer.

* * * * *

UNITED STATES PATENT AND TRADEMARK OFFICE
CERTIFICATE OF CORRECTION

PATENT NO. : 11,071,888 B2  
APPLICATION NO. : 16/260056  
DATED : July 27, 2021  
INVENTOR(S) : Hisada et al.

Page 1 of 1

It is certified that error appears in the above-identified patent and that said Letters Patent is hereby corrected as shown below:

On the Title Page

Item (57) under "ABSTRACT", Line 1, delete "near-field" and insert --near field--.

Item (57) under "ABSTRACT", Line 6, delete "near-field" and insert --near field--.

In the Claims

Column 10, Line 45 (Claim 1), delete "fil" and insert --(i)--.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*